(12) United States Patent
Wikström et al.

(10) Patent No.: US 10,667,299 B2
(45) Date of Patent: May 26, 2020

(54) CONTROL PLANE LATENCY REDUCTION IN A WIRELESS COMMUNICATIONS NETWORK

(71) Applicant: Telefonaktiebolaget LM Ericsson (publ), Stockholm (SE)

(72) Inventors: Gustav Wikström, Täby (SE); Mattias Bergström, Stockholm (SE); Magnus Stattin, Upplands Väsby (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 28 days.

(21) Appl. No.: 15/765,112

(22) PCT Filed: Jan. 23, 2018

(86) PCT No.: PCT/SE2018/050046
§ 371 (c)(1),
(2) Date: Mar. 30, 2018

(87) PCT Pub. No.: WO2018/139970
PCT Pub. Date: Aug. 2, 2018

(65) Prior Publication Data
US 2019/0059108 A1     Feb. 21, 2019

Related U.S. Application Data

(60) Provisional application No. 62/564,611, filed on Sep. 28, 2017, provisional application No. 62/449,917, filed on Jan. 24, 2017.

(51) Int. Cl.
*H04W 56/00*     (2009.01)
*H04W 74/08*     (2009.01)
*H04W 72/12*     (2009.01)

(52) U.S. Cl.
CPC ....... *H04W 74/0833* (2013.01); *H04W 72/12* (2013.01)

(58) Field of Classification Search
CPC .......................... H04W 74/0833; H04W 72/12
(Continued)

(56) References Cited

U.S. PATENT DOCUMENTS

2012/0250644 A1* 10/2012 Sambhwani ...... H04W 72/0413
                                                                370/329
2017/0164363 A1*  6/2017 Zhang ....................... H04L 1/00
(Continued)

FOREIGN PATENT DOCUMENTS

EP      2265077 A1    12/2010
WO   2012138756 A1    10/2012

OTHER PUBLICATIONS

International Search Report and Written Opinion dated Mar. 28, 2018 for International Application No. PCT/SE2018/050046 filed on Jan. 23, 2018, consisting of 14-pages.
(Continued)

*Primary Examiner* — Sai Ming Chan
(74) *Attorney, Agent, or Firm* — Christopher & Weisberg, P.A.

(57) ABSTRACT

A network node, wireless device and methods for provisioning uplink transmission are provided. In one embodiment, the network node includes node processing circuitry configured to: transmit at least one random access (RA) message and receive a response message. The at least one RA message includes an indication of radio resources, wherein the radio resources are valid in a plurality of time locations, for uplink transmission to respond to the at least one RA message. The response message is received according to one of the plurality of time locations for uplink transmission.

36 Claims, 10 Drawing Sheets

(58) Field of Classification Search
USPC .......................................................... 370/329
See application file for complete search history.

(56) References Cited

U.S. PATENT DOCUMENTS

2018/0035470 A1* 2/2018 Chen ..................... H04W 48/16
2018/0167980 A1* 6/2018 Shi ........................ H04W 72/02
2018/0227958 A1* 8/2018 Xiong ............... H04W 72/0406

OTHER PUBLICATIONS

3GPP TSG-RAN WG2 Meeting #NR R2-1700355; Title: "Discussion on latency of random access in NR"; Agenda Item: 3.2.1.4; Source: ASUSTeK; Document for: Discussion and Decision; Location and Date: Spokane, Washington, USA, Jan. 17-19, 2017, consisting of 4-pages.
3GPP TS 36.321 V14.0.0; "3rd Generation Partnership Project; Technical Specification Group Radio Access Network; Evolved Universal Terrestrial Radio Access (E-UTRA); Medium Access Control (MAC) protocol specification (Release 14)"; Sep. 2016, consisting of 96-pages.
RAN #75 pre-meeting discussions; WI on CP Latency Reduction in LTE; Comments on new proposed SI (RP-162448) Motivation for new WI; Ericsson, San Diego, Jan. 2017, consisting of 7-pages.
3GPP TSG RAN Meeting #75 RP-17XXXX; revision of RP-162294; Title: "New WI proposal: Enhancements for LTE Control Plane Latency"; Source: Ericsson; Document for: Information; Agenda Item: 10.1.1; Location and Date: Vienna, Austria, Dec. 5-8, 2017, consisting of 6-pages.

* cited by examiner

CONTROL PLANE LATENCY REDUCTION IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2018/050046, filed Jan. 23, 2018 entitled "CONTROL PLANCE LATENCY REDUCTION IN A WIRELESS COMMUNICATIONS NETWORK," which claims priority to U.S. Provisional Application No. 62/449,917, filed Jan. 24, 2017, entitled "CONTROL PLANE LATENCY REDUCTION IN LTE BY OVERPROVISIONING OF UL GRANTS," and to U.S. Provisional Application No. 62/564,611, filed Sep. 28, 2017 the entireties of all of which are incorporated herein by reference.

TECHNICAL FIELD

The disclosure relates to wireless communications, and in particular, to overprovisioning of uplink grants for latency reduction.

BACKGROUND

FIG. 1 is a block diagram of a system for Random Access (RA) in LTE for performing the RA signaling described in FIG. 2. System 10 includes one or more wireless devices 11a-n (referred to collectively as wireless devices 11) and one or more network nodes 12. In modern cellular radio systems such as system 10, the radio network has a strict control on the behavior of wireless device 11. Uplink transmission parameters like frequency, timing, and power are regulated via downlink control signaling from the base station to the terminal. For instance, by time-aligning the uplink (UL) transmissions, orthogonality between wireless devices can be achieved in the time domain, and this is necessary since the radio resources are scarce. UL as used herein refers to transmission from the wireless device to the network node.

At power-on or after a long standby time, the wireless device 11, e.g., User Equipment (UE), terminal, etc., is not synchronized in the uplink. The wireless device can derive an uplink frequency and power estimate from the downlink (control) signals. However, a timing estimate is difficult to make since the round-trip propagation delay between the network node 12, e.g., base station, eNodeB, etc., and the wireless device 11 is unknown. So even if the wireless device uplink timing is synchronized to the downlink, it may arrive too late at the receiver of network node 12 because of the propagation delays. Therefore, before commencing traffic, the wireless device has to carry out a Random Access (RA) procedure to the network. After the RA, the network node can estimate the timing misalignment of wireless device 11 uplink and send a correction message.

Usually, a Physical Random Access Channel (PRACH) is provided for wireless device 11 to request access to the network. A RA preamble is used which is based on a specific sequence with good auto-correlation. Because multiple wireless devices 11 can request access at the same time, collisions may occur between requesting wireless devices. A contention resolution scheme has to be implemented to separate wireless device 11 transmissions. To distinguish between different wireless devices 11 performing RA, typically many different preambles exist. Wireless device 11 performing RA randomly picks a preamble out of a pool and transmits it. The preamble represents a random wireless device ID which can be used by network node 12 when granting the wireless device access to the network. Network node 12 receiver can resolve RA attempts performed with different preambles and send a response message to each wireless device 11 using the corresponding random wireless device IDs. In case where multiple wireless devices 11 simultaneously use the same preamble, a collision occurs, and the RA attempts will most likely not be not successful since network node 12 cannot distinguish between the two wireless devices with the same random wireless device ID. To minimize the probability of collision, the set of available sequences should be large.

FIG. 2 is a block diagram of random access signaling in LTE as defined in 3GPP TS 36.321 and 36.213. Wireless device 11 transmits an RA preamble message, i.e., message 1 or Msg1, to network node 12 (Block S100). Network node 12, transmits an RA response message (Block S102). The RA response message includes a timing advance, uplink grant and other information known in the art as defined in 3GPP TS 36.321 and 36.213. Wireless device 11 transmits an RA message 3, i.e., msg3, to network node 12 (Block S104). The RA message 3 may include a wireless device identity, buffer status report (BSR), and other information known in the art as defined in 3GPP TS 36.321 and 36.213. Network node 12 transmits an RA contention resolution message to wireless device 11 (Block S106). The RA contention resolution message may include an UL grant, DL assignment and other information defined in 3GPP TS 36.321 and 36.213. Wireless device 11 and network node 12 participate in further uplink and/or downlink transmission (Block S108).

Network node 12 receiver listens at all RA opportunities to detect preambles. In case a preamble is successfully detected, a RA response that includes, e.g., the number of the detected preamble, timing advance information and UL grant for an UL transmission (e.g., Msg3 in step 3 of the RA procedure), is sent in a special message on the downlink (DL). The UL grant included in a RA response is henceforth referred to as an RA response grant.

A wireless device 11 that has recently performed a RA preamble transmission is listening within a certain time window after the preamble has been sent to receive a RA response. In case of a successful reception of the RA response, wireless device 11 continues with Blocks S104 and S106 of the RA procedure. In case no RA response is received within the specified window, a new attempt is made.

After receiving the RA Response, wireless device 11 decodes the message and reads the enclosed RA Response grant. Wireless device 11 then sends the RA msg3 using this grant. In LTE, the timing of the grant is given by the standard and a flag inside the grant.

In LTE, wireless device 11 shall, according to the UL grant information in the RA response, transmit an UL-SCH transport block in the first subframe $n+k_1$, $k_1 \geq 6$, if the UL delay field is set to zero where $n+k_1$ is the first available UL subframe for PUSCH transmission. Wireless device 10 shall postpone the PUSCH transmission to the next available UL subframe after $n+k_1$ if the field is set to 1.

SUMMARY

Some embodiments advantageously provide a method, network node and wireless device for overprovisioning of uplink grants for latency reduction.

According to one aspect of the disclosure, a network node for provisioning uplink transmission is provided. The network node includes node processing circuitry configured to: transmit at least one random access (RA) message and receive a response message. The at least one RA message includes an indication of radio resources, wherein the radio resources are valid in a plurality of time locations for uplink transmission to respond to the at least one RA message. The response message is received according to one of the plurality of time locations for uplink transmission.

According to one embodiment of this aspect, the at least one RA message includes a first RA message and a second RA message. The first RA message indicates a first time location of the plurality of time locations for uplink transmission to response to the first RA message. The second RA message indicates a second time location of the plurality of time locations different from the first time location for uplink transmission to response to the second RA message.

According to one embodiment of this aspect, the at least one RA message is a single RA message. The plurality of time locations includes a first time location for a first type of wireless device, and a second time location for a second type of wireless device. According to one embodiment of this aspect, the first time location for a first type of wireless device is the same as the second time location for a second type of wireless device.

According to one embodiment of this aspect, the first type of wireless device is a legacy wireless device. The second type of wireless device is a non-legacy wireless device. According to one embodiment of this aspect, the first time location for a first type of wireless device is different from the second time location for a second type of wireless device. The second time location reduces signaling latency when compared to signaling latency of the first time location. According to one embodiment of this aspect, the plurality of time locations includes a first time location and a second time location different from the first time location. The first time location indicates a subframe $n+k_1$ for the uplink transmission, where $k_1$ is one of greater than and equal to 6 and the second time location indicates a subframe $n+k_2$ for the uplink transmission, where $k_2$ is less than 6. According to one embodiment of this aspect, the node processing circuitry is further configured to receive an RA preamble message. The RA message is transmitted in response to the received RA preamble message.

According to another aspect of the disclosure, a method for a network node for provisioning uplink transmission is provided. At least one random access (RA) message is transmitted. The at least one RA message includes an indication of radio resources, wherein the radio resources are valid in a plurality of time locations for uplink transmission to respond to the at least one RA message. A response message is received. The response message is received according to one of the plurality of time locations for uplink transmission.

According to one embodiment of this aspect, the at least one RA message includes a first RA message and a second RA message. The first RA message indicates a first time location of the plurality of time locations for uplink transmission to response to the first RA message. The second RA message indicates a second time location of the plurality of time locations different from the first time location for uplink transmission to response to the second RA message. According to one embodiment of this aspect, the at least one RA message is a single RA message. The plurality of time locations includes: a first time location for a first type of wireless device, and a second time location for a second type of wireless device.

According to one embodiment of this aspect, the first time location for a first type of wireless device is the same as the second time location for a second type of wireless device. According to one embodiment of this aspect, the first type of wireless device is a legacy wireless device. The second type of wireless device is a non-legacy wireless device. According to one embodiment of this aspect, the first time location for a first type of wireless device is different from the second time location for a second type of wireless device. The second time location reduces signaling latency when compared to signaling latency of the first time location. According to one embodiment of this aspect, the plurality of time locations includes a first time location and a second time location different from the first time location. The first time location indicates a subframe $n+k_1$ for the uplink transmission, where $k_1$ is one of greater than and equal to 6. The second time location indicates a subframe $n+k_2$ for the uplink transmission, where $k_2$ is less than 6. According to one embodiment of this aspect, an RA preamble message is received. The RA message is transmitted in response to the received RA preamble message.

According to another aspect of the disclosure, a wireless device is provided. The wireless device includes device processing circuitry configured to: receive at least one random access (RA) message. The at least one RA message includes an indication of radio resources, wherein the radio resources are valid in a plurality of time locations for uplink transmission to response to the received at least one RA message. The device processing circuitry is further configured to transmit a response message according to one of the plurality of time locations for uplink transmission According to one embodiment of this aspect, the at least one RA message includes a first RA message and a second RA message. The first RA message indicates a first time location of the plurality of time locations for uplink transmission to respond to the first RA message. The second RA message indicates a second time location of the plurality of time locations different from the first time location for uplink transmission to respond to the second RA message. The transmitted response message is transmitted according to one of the first time location and the second time location.

According to one embodiment of this aspect, the at least one RA message is a single RA message. The plurality of time locations includes: a first time location for a first type of wireless device and a second time location for a second type of wireless device. The transmitted response message is transmitted according to one of the first time location for the first type of wireless device and the second time location for the second type of wireless device. According to one embodiment of this aspect, the first type of wireless device is a legacy wireless device. The second type of wireless device is a non-legacy wireless device.

According to one embodiment of this aspect, the first time location for a first type of wireless device is the same as the second time location for a second type of wireless device. According to one embodiment of this aspect, the first time location for a first type of wireless device is different from the second time location for a second type of wireless device. The second time location reduces signaling latency when compared to signaling latency of the first time location. According to one embodiment of this aspect, the plurality of time locations includes a first time location and a second time location different from the first time location. The first time location indicates a subframe $n+k_1$ for the uplink transmission, where $k_1$ is one of greater than and equal to 6. The second time location indicates a subframe $n+k_2$ for the uplink transmission, where $k_2$ is less than 6. According to one embodiment of this aspect, the device processing circuitry is further configured to transmit an RA preamble message. The RA message is received in response to the transmitted RA preamble message.

According to another aspect of the disclosure, a method for a wireless device is provided. At least one random access (RA) message is received. The at least one RA message includes an indication of radio resources, wherein the radio resources are valid in a plurality of time locations, for uplink transmission to response to the received at least one RA message. A response message according to one of the plurality of time locations for uplink transmission is transmitted.

According to one embodiment of this aspect, the at least one RA message includes a first RA message and a second RA message. The first RA message indicates a first time location of the plurality of time locations for uplink transmission to respond to the first RA message. The second RA message indicates a second time location of the plurality of time locations different from the first time location for uplink transmission to respond to the second RA message. The transmitted response message is transmitted according to one of the first time location and the second time location.

According to one embodiment of this aspect, the at least one RA message is a single RA message, the plurality of time locations includes: a first time location for a first type of wireless device and a second time location for a second type of wireless device. The transmitted response message is transmitted according to one of the first time location for the first type of wireless device and the second time location for the second type of wireless device. According to one embodiment of this aspect, the first type of wireless device is a legacy wireless device. The second type of wireless device is a non-legacy wireless device.

According to one embodiment of this aspect, the first time location for a first type of wireless device is the same as the second time location for a second type of wireless device. According to one embodiment of this aspect, the first time location for a first type of wireless device is different from the second time location for a second type of wireless device. The second time location reduces signaling latency when compared to signaling latency of the first time location. According to one embodiment of this aspect, the plurality of time locations includes a first time location and a second time location different from the first time location. The first time location indicates a subframe $n+k_1$ for the uplink transmission, where $k_1$ is one of greater than and equal to 6. The second time location indicates a subframe $n+k_2$ for the uplink transmission, where $k_2$ is less than 6. According to one embodiment of this aspect, an RA preamble message is transmitted. The RA message being received in response to the transmitted RA preamble message.

According to another aspect of the disclosure, a network node for provisioning uplink transmission is provided. The network node includes a scheduling module configured to: transmit at least one random access (RA) message and receive a response message. The at least one RA message includes an indication of a plurality of time locations for uplink transmission to respond to the at least one RA message. The response message is received according to one of the plurality of time locations for uplink transmission.

According to another aspect of the disclosure, a wireless device is provided. An access module configured to: receive at least one random access (RA) message. The at least one RA message includes an indication of radio resources, wherein the radio resources are valid in a plurality of time locations, for uplink transmission to response to the received at least one RA message. The access module is further configured to transmit a response message according to one of the plurality of time locations for uplink transmission The detailed aspects of the disclosure thus provide a mechanism by which a wireless device can indicate to a network node its capacity to perform control plane latency reduction (i.e. reduced processing time compared to legacy wireless devices during processes such as random access processes). The network node may provide an indication to the wireless device of resources which are valid in a plurality of time locations. The wireless device may then utilize the resources according to its capability to utilize control plane latency reduction. If the wireless device is able to utilize control plane latency reduction, the wireless device may transmit a response message in a first time location of the plurality of time locations; if the wireless device is unable to utilize control plane latency reduction, the wireless device may transmit a response message in a second time location of the plurality of time locations. Thus the network node may determine whether the wireless device is capable of performing control plane latency reduction according to which time location is utilized by the wireless device to transmit the response message.

This concept may be extended to signaling of other capabilities of the wireless device. Thus, in general, a wireless device may be granted resources which are valid in a plurality of time locations. By selecting a particular one of those time locations, the wireless device can signal implicitly its capability to perform a particular function, e.g. a feature of a telecommunication standard implemented in the wireless communication network. For example, the wireless device may signal its capability to utilize particular transmission schemes, such as higher-order MIMO, etc.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 3:
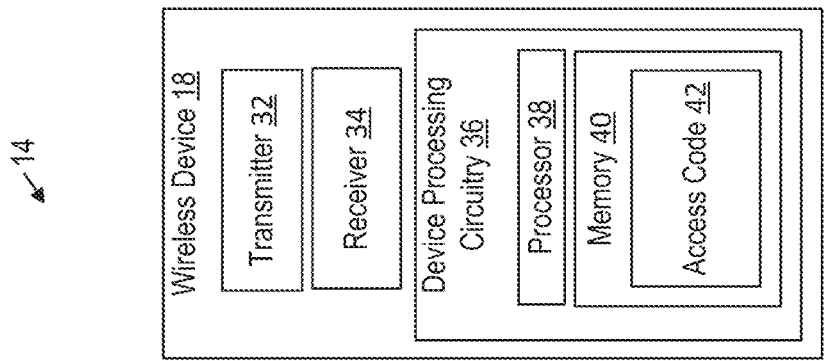
FIG. 3 is an exemplary system for provisioning of uplink (UL) grant in accordance with the principles of the present disclosure.
Figure 3:
Figure 3:
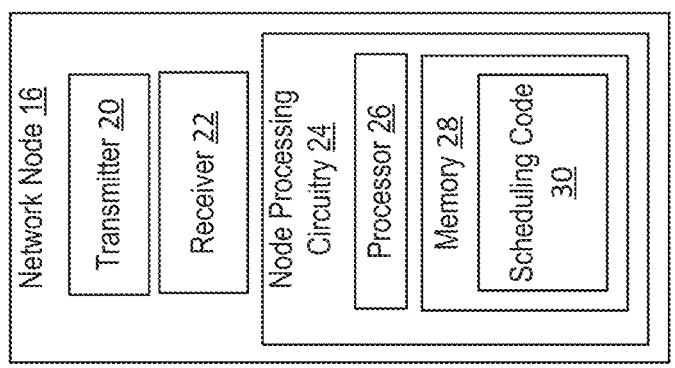

Referring now to drawing figures in which like reference designators refer to like element there is shown in FIG. 3 an exemplary system for the provisioning of uplink (UL) grants in accordance with the principles of the present invention and designated generally as "14." System 14 includes one or more nodes 16 and one or more wireless devices 18. Node 16 can be any kind of network node which may comprise of a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc. In one or more embodiments, functions described herein with respect to node 16 are performed in a distributed manner among several nodes 16 such as in a network cloud.

Network node 16 includes one or more transmitters 20 and one or more receivers 22 for communicating with wireless device 18 using one or more communication protocols known in the art such as LTE based communication protocols. In one or more embodiments, transmitter 20 and receiver 22 include or are replaced by one or more communication interfaces.

Network node 16 includes processing circuitry 24. Processing circuitry 24 includes processor 26 and memory 28. Processing circuitry 24 may comprise integrated circuitry for processing and/or control, e.g., one or more processors and/or processor cores and/or FPGAs (Field Programmable Gate Array) and/or ASICs (Application Specific Integrated Circuitry). Processor 26 may be configured to access (e.g., write to and/or reading from) memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be configured to store code executable by processor 26 and/or other data, e.g., data pertaining to communication, e.g., configuration and/or address data of nodes, etc.

Processing circuitry 24 may be configured to control any of the methods and/or processes described herein and/or to cause such methods and/or processes to be performed, e.g., by network node 16. Corresponding instructions may be stored in memory 28, which may be readable and/or readably connected to processor 26. One or more processors 26 are configured to perform node 12 functions described herein. Memory 28 is configured to store data, programmatic software code and/or other information described herein. Memory 28 is configured to store scheduling code 30. For example, scheduling code 30 includes instructions that, when executed by processor 26, causes processor 26 to perform the process discussed in detail with respect to FIG. 4. Note further, that functions described herein as being performed by network node 16 may be distributed over a plurality of network nodes 16. In other words, it is contemplated that the functions of the network node described herein are not limited to performance by a single physical device and, in fact, can be distributed among several physical devices within a single physical location or across a network such as the Internet.

Wireless device 18 includes one or more transmitters 32 and one or more receivers 34 for communicating with network node 16 and/or other entities in system 14. Wireless device 18 may be a radio communication device, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Wireless device includes processing circuitry 36. Processing circuitry 36 includes processor 38 and memory 40. Processing circuitry 36 may comprise integrated circuitry for processing and/or control, e.g., one or more processors and/or processor cores and/or FPGAs (Field Programmable Gate Array) and/or ASICs (Application Specific Integrated Circuitry). Processor 38 may be configured to access (e.g., write to and/or reading from) memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 40 may be configured to store code executable by processor 38 and/or other data, e.g., data pertaining to communication, e.g., configuration and/or address data of nodes, etc.

Processing circuitry 36 may be configured to control any of the methods and/or processes described herein and/or to cause such methods and/or processes to be performed, e.g., by wireless device 18. Corresponding instructions may be stored in memory 40, which may be readable and/or readably connected to processor 38.

One or more processors 38 are configured to perform wireless device 18 functions described herein. Memory 40 is configured to store data, programmatic software code and/or other information described herein. Memory 40 is configured to store access code 42. For example, access code 42 includes instructions that, when executed by processor 38, causes processor 38 to perform the process discussed in detail with respect to FIG. 5.

For a new type wireless device 18, e.g., non-legacy wireless device 18, the processing delay can be reduced for the radio resource control (RRC) Connection Resume Request. However, network node 16 doesn't know at the point of sending the random access (RA) Response Grant if wireless device 18 is of legacy or new type.

The instant disclosure overprovisions msg3, i.e., RA message 3 or response message from wireless device 18, scheduling opportunities. In one embodiment, network node 16 sends two RA Response messages each containing a RA Response Grant to wireless device 18. One will be a legacy message with $n+k_1$ timing for the msg3, the other a new message with a new n+k timing for the msg3. Alternatively, the new type wireless device 18 applies the new n+k timing when receiving the RA Response Grant.

This allows for the latency for transition between IDLE and CONNECTED mode to be reduced. For example, during Random Access, network node 16 schedules both legacy and shorter timing for msg3, where a new type wireless device 18 uses the shorter timing either by reading a new RA Response message, or by applying a new timing on the legacy message, and legacy wireless device 18 procedure is not affected.

Scheduling of Resources

At the point in time of sending RA Response, network node 16 doesn't know whether wireless device 18 is of legacy or new type. Therefore, network node 16 overprovisions msg3 scheduling opportunities by being prepared to receive msg3 from wireless device 18 with timing $n+k_1$ for a legacy wireless device 18, and also with timing n+k for a new type wireless device 18. Network node 16 therefore schedules both resources.

Overprovisioning of RA Response Grants

Network node 16 issues two RA Response messages after receiving a RACH preamble, namely, Legacy RA Response Grant and New RA Response Grant.

Legacy RA Response Grant

The first of these two RA Response messages is a legacy message that contains an uplink (UL) grant as defined in Third Generation Partnership Project (3GPP) Technical Specification (TS) 36.321 and 36.213. This UL grant has the legacy timing $n+k_1$, as described as:

In Long Term Evolution (LTE), wireless device 18 shall, according to the UL grant information in the RA response, transmit an UL-SCH transport block in the first subframe $n+k_1$, $k_1 \geq 6$, if the UL delay field is set to zero where $n+k_1$ is the first available UL subframe for Physical Uplink Shared Channel (PUSCH) transmission. Wireless device 18 shall postpone the PUSCH transmission to the next available UL subframe after $n+k_1$ if the field is set to 1.

Legacy wireless device 18 will decode this message and proceed to use the UL grant for msg3.

New RA Response Grant

The second of these two RA Response messages is a message that contains a new UL grant. This UL grant has a timing of n+k. As one example this timing follows the legacy definition with $k_1$ replaced by $k_{new}$. New type wireless device 18 can decode this message and will then discard the first RA Response message. Legacy wireless device 18 will not decode the second message and will therefore use the UL grant of the first RA response message.

Single RA Response Grant

In an alternative embodiment, only one RA Response is sent from network node 16. This RA Response contains a RA Response grant that can be identical to the legacy one. For example:

legacy wireless device 18 applies the legacy timing $n+k_1$, as described in 3GPP TS 36.213 and 36.321, as is known in the art.

new type wireless device 18 applies a new timing n+k. In one example $k \geq k_{new}$ if UL delay bit=0, where n+k is the first available UL subframe. If the UL delay field bit=1 wireless device 18 postpones the transmission to next available UL subframe after n+k. Thereby, the timing procedure can follow the legacy definition with six replaced by $k_{new}$.

Example Timing

As one example, new type wireless device 18 follows a timing of $k_{new}$=4 subframes, thereby reducing the signaling latency with 2 ms.

The network node 16 thus provisions the wireless device 18 with transmission resources which are valid in multiple time locations. For example, the network node 16 may transmit multiple messages to the wireless device 18, each message comprising grant of resources in a respective time location. Alternatively, the network node 16 may transmit a message to the wireless device 18 comprising a grant of resources which are valid in multiple time locations. The resources (e.g. transmission frequencies) may be the same or different in the different time locations.

In this context, the term "time location" refers to a time instance defined according to the particular standard implemented in the wireless communications network. Suitable examples for time locations include transmission time intervals (TTIs), sub-frames, time slots, time mini-slots, etc.

The network node 16 is thus able to determine whether the wireless device 18 is capable of processing control messages relatively quickly (e.g. the wireless device 18 is a new-type wireless device), or relatively slowly (e.g. the wireless device 18 is a legacy wireless device) based on the resources used by the wireless device to transmit the RA response message. If the wireless device 18 applies the legacy timing (i.e. $n+k_1$), the network node 16 may determine that the wireless device 18 can only process control plane signals at a relatively slow rate (i.e. at a legacy rate); if the wireless device 18 applies the new timing (i.e. n+k or $k_{new}$), the network node 16 may determine that the wireless device 18 is capable of processing the control plane signals at a relatively faster rate.

Msg4 and Further Messages

Figure 1:
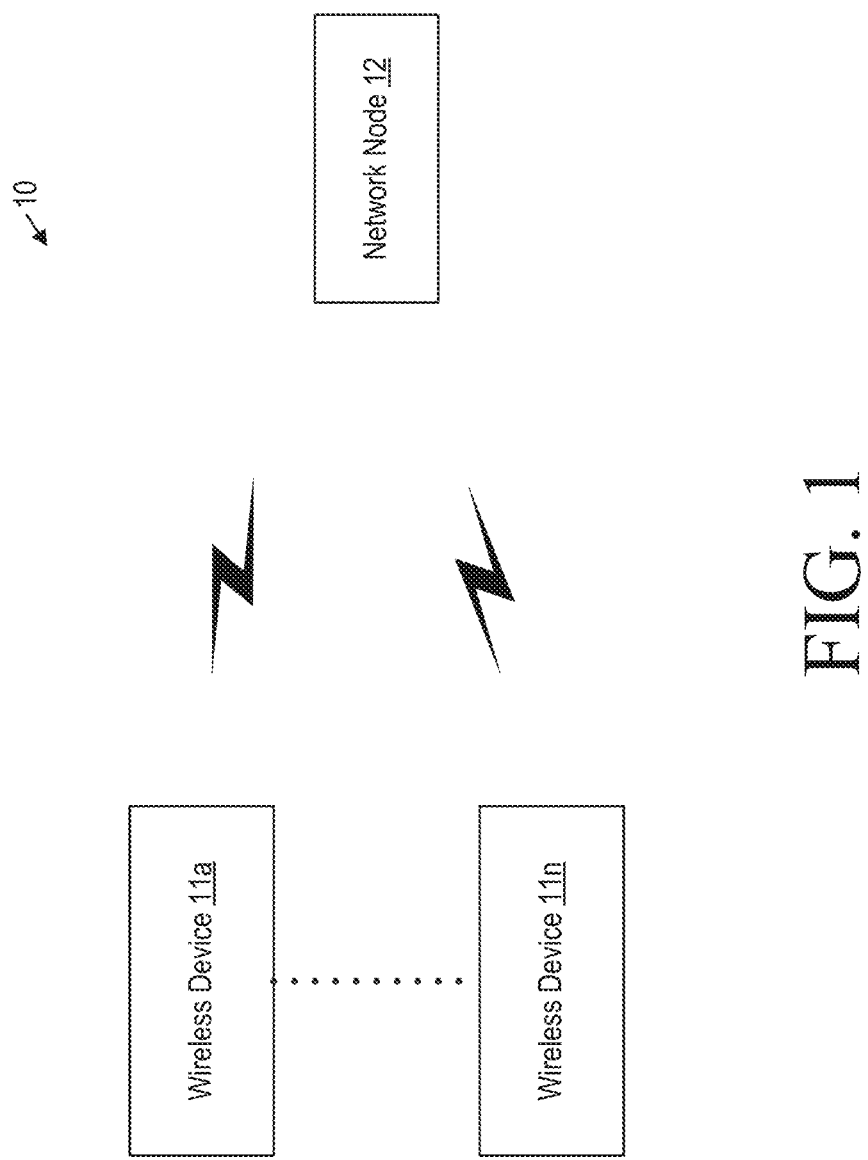
FIG. 1 a block diagram of a system for Random Access (RA) in LTE for performing the RA signaling.
Figure 2:
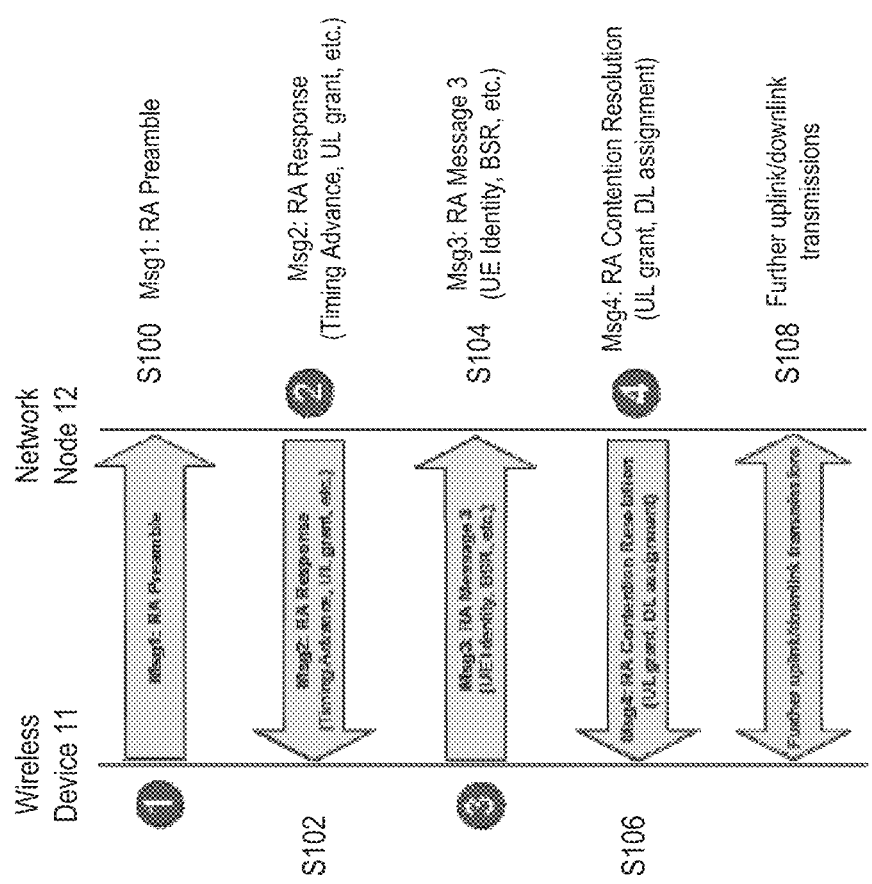
FIG. 2 is a block diagram of random access signaling in LTE as defined in 3GPP TS 36.321 and 36.213.

In further embodiments, the network node 16 transmits one or more further messages to the wireless device 18 as part of the RA procedure (see FIG. 2). For example, the network node may transmit msg4, also known as RA Contention Resolution or RRC Connection Resume. Msg4 may comprise a grant of resources, or be accompanied by an additional message comprising such a grant of resources. For example, the additional message may comprise a transmission on a downlink control channel, such as the physical downlink control channel (PDCCH), and a grant of resources using downlink control information (DCI). The grant of resources may be used by the wireless device 18 to transmit one or more uplink messages, such as a response to the further message msg4 (e.g. a request to establish an RRC connection), or user data. The resources may be defined according to the legacy timing responsive to a determination that the wireless device is a legacy wireless device. In such an example, the resources may indicate a time location which is a relatively long time after the transmission of the message containing the grant of resources (e.g. N+5, where N is the time location at which the message was transmitted), to allow for the slower processing by the wireless device 18. Alternatively, the resources may indicate a time location which is a relatively short time after the transmission of the message containing the grant of resources (e.g. N+3), responsive to a determination that the wireless device is a new-type wireless device, or is otherwise capable of processing control plane messages quicker than legacy devices.

Figure 4:
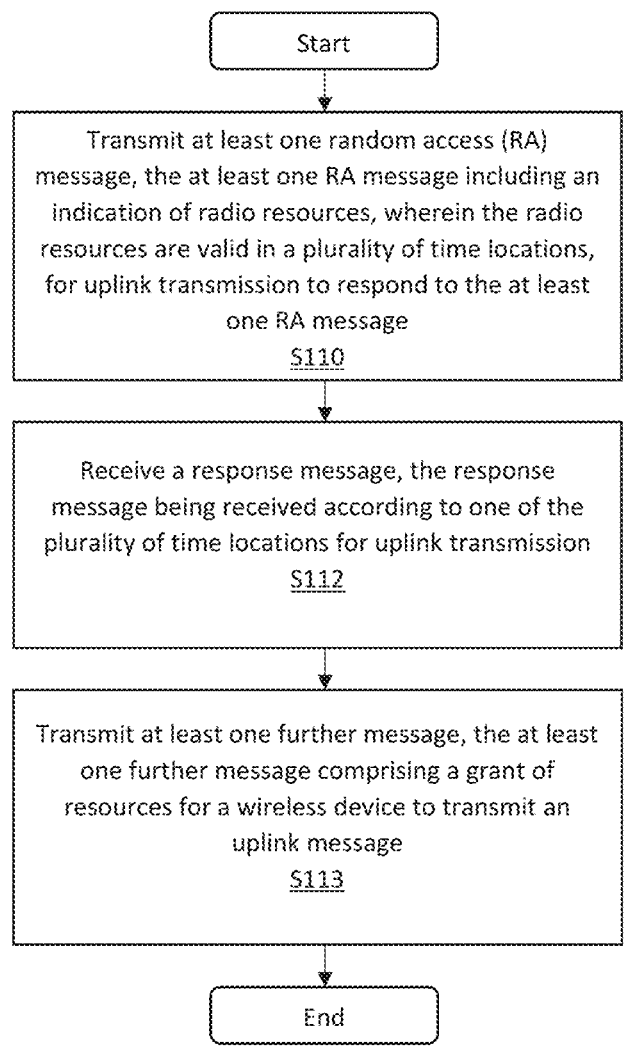
FIG. 4 is a flow diagram of an exemplary scheduling process of scheduling code 30 in accordance with the principles of the disclosure.

FIG. 4 is a flow diagram of an exemplary scheduling process of scheduling code 30 in accordance with the principles of the disclosure. Node processing circuitry 24 transmits at least one random access (RA) message (Block S110). In one or more embodiments, the at least one RA message includes an indication of radio resources, wherein the radio resources are valid in a plurality of time locations, for uplink transmission to respond to the at least one RA message. In one or more embodiments, the at least one RA message is described above in "Overprovisioning of RA Response Grants" and "Single RA Response Grant", among other sections of the instant disclosure. Node processing circuitry 24 receives a response message (Block S112). In one or more embodiments, the response message is received according to one of the plurality of time locations for uplink transmission. In one or more embodiments, the response message, e.g., msg3, is described above in "Overprovisioning of RA Response Grants" and "Single RA Response Grant", among other sections of the instant disclosure. Node processing circuitry 24 transmits at least one further message (Block S113), comprising a grant of resources for a wireless device (i.e. the wireless device from which the response message was received in Block S112) in which to transmit an uplink message. For example, the uplink message may be transmitted in response to the at least one further message. In one or more embodiments, the further message is a Msg4 message, a RRC Connection Resume message or a RA Contention Resolution message. In alternative embodiments, the further message is transmitted on a physical control channel, such as the PDCCH, and may comprise downlink control information defining the granted resources. The granted resources may be used by the wireless device 18 to transmit one or more uplink messages, such as a response to the further message msg4 (e.g. a request to establish an RRC connection), or user data. The resources may comprise resources in a first time location relative to the transmission of the further message, responsive to a determination that the response message is received in the first time location relative to transmission of the RA message in Block S110; or resources in a second time location relative to the transmission of the further message, responsive to a determination that the response message is received in the second time location relative to transmission of the RA message in Block S110. For example, the resources may be defined according to a legacy timing responsive to a determination that the wireless device 18 is a legacy device; the resources may be defined according to a new timing responsive to a determination that the wireless device 18 is a new-type device. See "Example timing" and "Msg4 and further messages" above.

Figure 5:
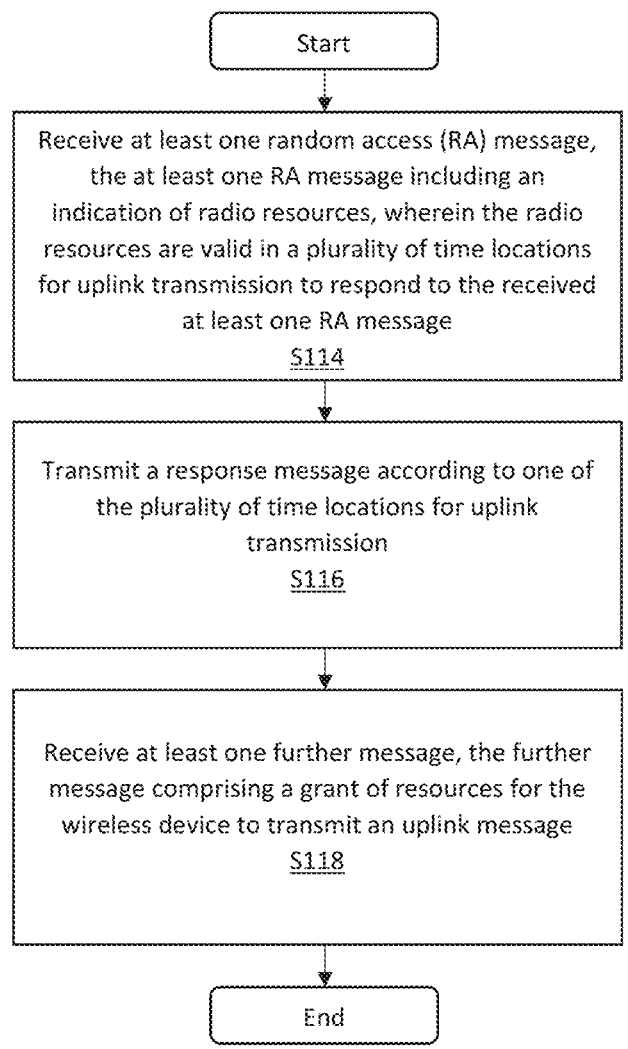
FIG. 5 is a flow diagram of an exemplary access process of access code 42 in accordance with the principles of the disclosure.

FIG. 5 is a flow diagram of an exemplary access process of access code 42 in accordance with the principles of the disclosure. Device processing circuitry 36 receives at least one random access (RA) message (Block S114). In one or more embodiments, the at least one RA message includes an indication of radio resources, wherein the radio resources are valid in a plurality of time locations, for uplink transmission to respond to the received at least one RA message. In one or more embodiments, the at least one RA message is described above in the "Overprovisioning of RA Response Grants" and "Single RA Response Grant" sections, among other sections of the instant disclosure. Device processing circuitry may transmit a response message according to one of the plurality of time locations for uplink transmission (Block S116). In one or more embodiments, the response message is received according to one of the plurality of time locations for uplink transmission. In one or more embodiments, the response message, e.g., msg3, is described above in "Overprovisioning of RA Response Grants" and "Single RA Response Grant", among other sections of the instant disclosure. Device processing circuitry 36 receives at least one further message (Block S118), comprising a grant of resources for the wireless device in which to transmit a further response message to the further RA message. In one or more embodiments, the further message is a Msg4 message, a RRC Connection Resume message or a RA Contention Resolution message. In alternative embodiments, the further message is transmitted on a physical control channel, such as the PDCCH, and may comprise downlink control information defining the granted resources. The uplink message may be a transmission of uplink data (e.g. user data), for example. The resources may comprise resources in a first time location relative to the transmission of the further message, responsive to a determination that the response message is received in the first time location relative to transmission of the RA message in Block S110; or resources in a second time location relative to the transmission of the further message, responsive to a determination that the response message is received in the second time location relative to transmission of the RA message in Block S110. For example, the resources may be defined according to a legacy timing responsive to a determination that the wireless device 18 is a legacy device; the resources may be defined according to a new timing responsive to a determination that the wireless device 18 is a new-type device. See "Example timing" and "Msg4 and further messages" above.

Figure 6:
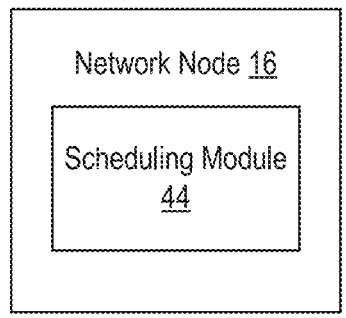
FIG. 6 is a block diagram of an alternative embodiment of network node 16 in accordance with the principles of the disclosure.

FIG. 6 is a block diagram of an alternative embodiment of network node 16 in accordance with the principles of the disclosure. Network node 16 includes scheduling module 44 that is configured to perform the process described above with respect to FIG. 4.

Figure 7:
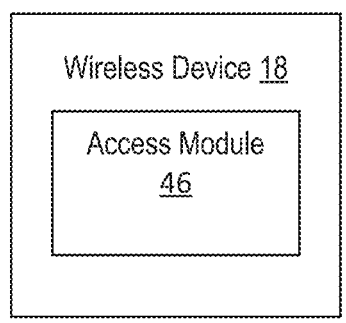
FIG. 7 is a block diagram of an alternative embodiment of wireless device 18 in accordance with the principles of the disclosure.

FIG. 7 is a block diagram of an alternative embodiment of wireless device 18 in accordance with the principles of the disclosure. Wireless device 18 includes access module 46 that is configured to perform the process of FIG. 5.

Indication of RA Response Grant Timing

In an embodiment, the network, e.g., network node 16 or another node within network 14, indicates the timing procedure for the RA response grant. The indication can be provided in, for instance, the system information (SI), in L1/L2 control signaling (on, e.g., PDDCH) or in a RA Response message. This indication can indicate that new type wireless device 18 applies the shorter timing when reading the RA Response grant. Alternatively, the network, e.g., network node 16 or another node within network 14, can indicate to new type wireless device 18 that it will transmit the new type of RA Response message, for which new type wireless device 18 should apply a new timing.

Figure 8:
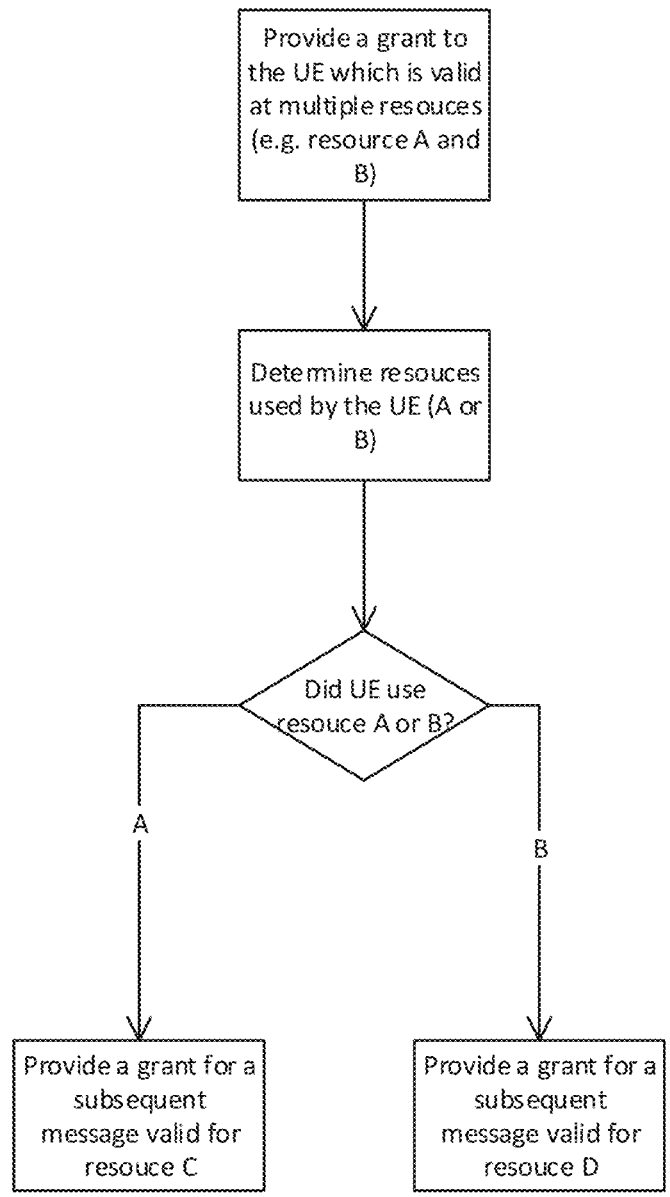
FIG. 8 is a flow diagram of a method in a network node in accordance with the principles of the disclosure.

FIG. 8 is a flowchart of a method in a network node in accordance with principles of the disclosure. In a first step, the network node provides a grant of resources to a wireless device 18 which are valid in multiple time locations (referred to as resources A and B in the illustration). As noted above, the grant may be included in one or multiple messages to the wireless device. A response message is subsequently received from the wireless device, using resources in one of the multiple time locations. As will be noted from the description below, particularly with respect to FIG. 9, the wireless device selects one of the time locations according to its capability to perform a certain function (e.g. a function defined in a standard implemented within the wireless communications network) and/or its current operating state (e.g. its current processing capacity). The network node thus determines which time location the wireless device used to transmit the response message and, based on the time location, infers the wireless device's capability to perform the certain function and/or the current operating state of the wireless device. If the wireless device used resources A, the network node provides a grant to the wireless device of resources (resources C) in which to transmit a subsequent message. If the wireless device used resources B, the network node provides a grant to the wireless device of resources (resources D) in which to transmit a subsequent message. For example, resources A may be defined in a time location which is relatively late after transmission of the grant of resources in the first step, while resources B may be defined in a time location which is relatively soon after transmission of the grant of resources in the first step (i.e. sooner than resources A). Similarly, resources C may be defined in a time location which is relatively late after transmission of the grant of resources in the final step, while resources D may be defined in a time location which is relatively soon after transmission of the grant of resources in the final step (i.e. sooner than resources C).

Figure 9:
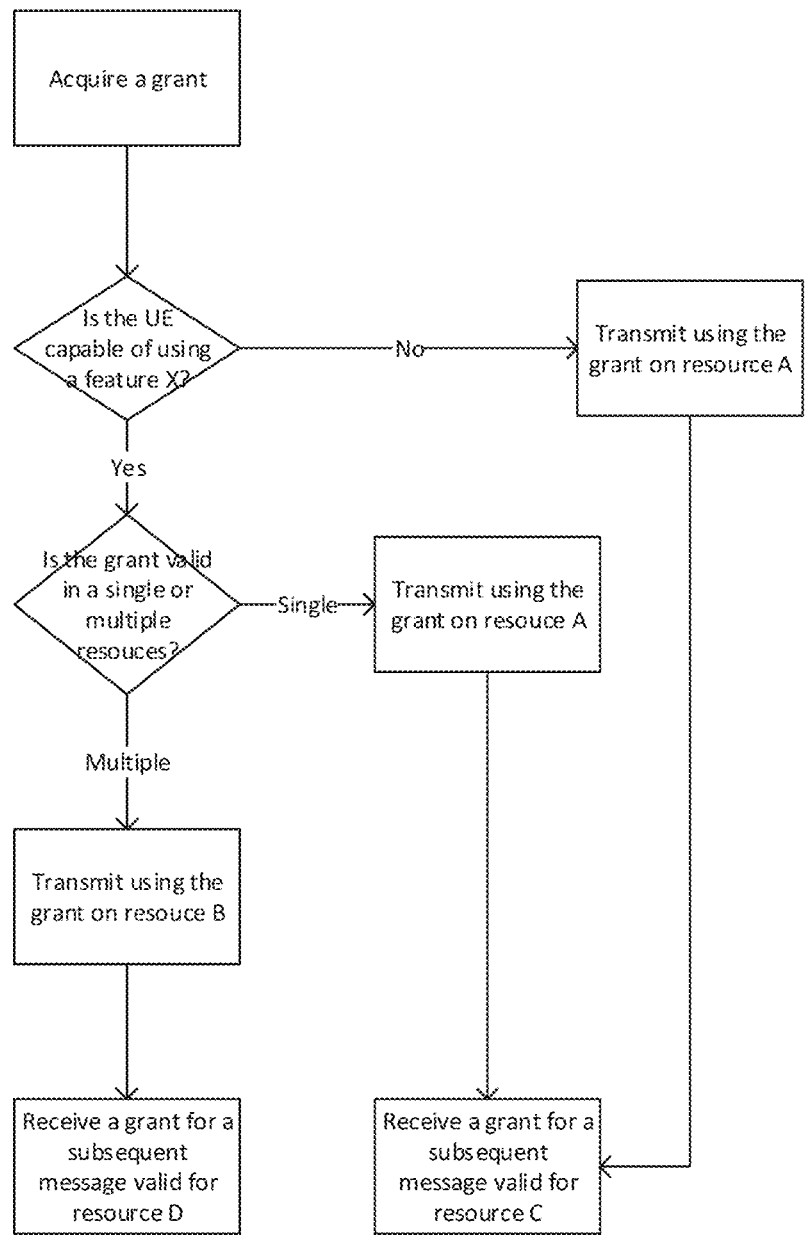
FIG. 9 is a flow diagram of a method in a wireless device in accordance with the principles of the disclosure.

FIG. 9 is a flowchart of a method in a wireless device in accordance with principles of the disclosure. In a first step, the wireless device receives a grant of resources to a wireless device 18 which may be valid in multiple time locations (referred to as resources A and B in the illustration). As noted above, the grant may be included in one or multiple messages to the wireless device. The wireless device selects one of the time locations according to its capability to perform a certain function (e.g. a function defined in a standard implemented within the wireless communications network) and/or its current operating state (e.g. its current processing capacity). For example, if the wireless device is incapable of performing the certain function (e.g. it can only process control plane messages at a first, relatively slow, rate), and/or the wireless device is currently experiencing a relatively high processing load (e.g. a processing load which is above a threshold), the wireless device may select resources A to transmit the response message to the network node. If the wireless device is capable of performing the function (e.g. it can process control plane messages at a second, relative fast, rate), and/or the wireless device is currently experiencing a relatively low processing load (e.g. a processing load which is below a threshold), the wireless device may determine whether the grant of resources is valid in multiple time locations or only a single time location. If a single time location, the wireless device also transmits the response message using resources A. If multiple time locations, the wireless device selects resources B on which to transmit the response message. For example, resources B may be relatively sooner after the receipt of the grant in the first step than resources A.

After the response message is transmitted, a further grant for transmission of a subsequent message is received from the network node. If the response message was transmitted using resources A, the grant comprises resources C; if the response message was transmitted using resources B, the grant comprises resources D. Resources D may be valid in a time location which is relatively sooner than resources C.

Note that the various steps of FIG. 9 may be performed in a different order without affecting the efficacy of the overall method. For example, the wireless device may determine whether the grant is valid in a single or multiple time locations prior to determining its capability to perform the function and/or its current processing load.

Figure 10:
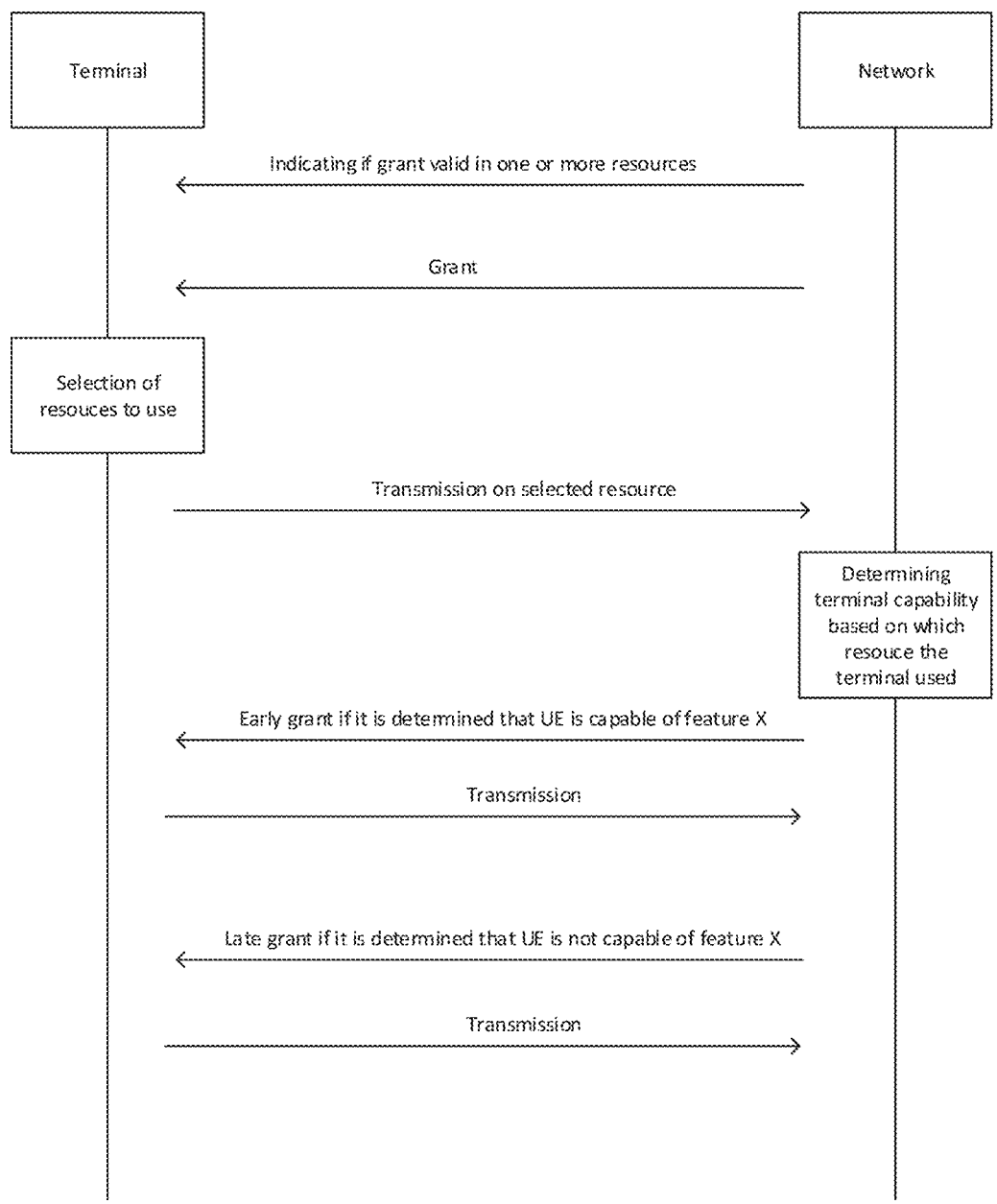
FIG. 10 is a signaling diagram of signals between a wireless device and a network node in accordance with the principles of the disclosure.

FIG. 10 shows a signaling diagram between a wireless device or terminal and a network node according to principles of the present disclosure. The network node signals a grant of resources to the wireless device, and provides an indication as to whether the resources are valid in one or multiple time locations. Alternatively, the network node may provide multiple grants of resources which are each valid in different time locations.

The wireless device selects which resources to use, based on its capability to perform a certain function (e.g. a function defined in a standard implemented within the wireless communications network) and/or its current operating state (e.g. its current processing capacity). For example, the function may relate to the rate at which the wireless device can process control plane messages. The wireless device then transmits a message utilizing the selected resources.

The network node receives the message and determines, based on the resources (i.e. the time location) on which the message was transmitted, the wireless device's capability to perform the function and/or current operating state. If the wireless device is capable of performing the function and/or has a relatively low processing load, the network node may transmit a relatively early grant of resources to the wireless device in which to transmit one or more further uplink messages. Thus the wireless device's ability to process control plane messages quickly can be utilized to reduce the latency of the signaling. If the wireless device is incapable of performing the function and/or has a relatively high processing load, the network node may transmit a relatively late grant of resources (i.e. resources in a time location which is later than the relatively early grant of resources) to the wireless device in which to transmit one or more further uplink messages.

Figure 11:
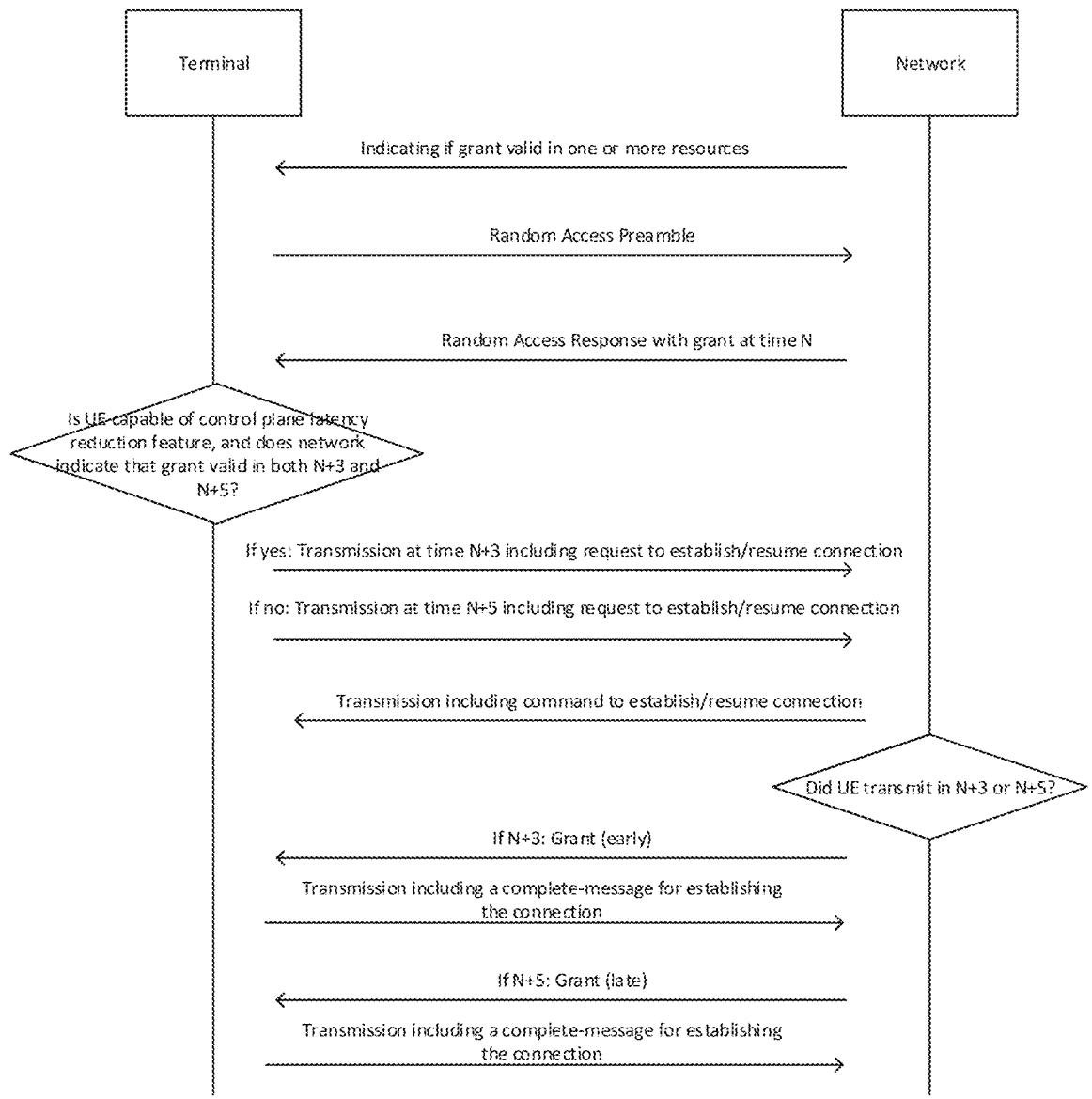
FIG. 11 is a further signaling diagram of signals between a wireless device and a network node in accordance with the principles of the disclosure.

FIG. 11 shows a signaling diagram between a wireless device or terminal and a network node according to principles of the present disclosure, during a random access procedure. The network node may pre-configure the wireless device with an indication as to whether a grant of resources to the wireless device is valid in one or multiple time locations. Alternatively, the network node may provide such an indication with the grant of resources itself, or provide multiple grants of resources which are each valid in different time locations.

The wireless device subsequently transmits a random access preamble to the network node, upon initiation of the random access procedure. The network node responds by transmitting a random access response message to the wireless device at time N. The random access response message comprises a grant of resources in which the wireless device can respond to the random access response message and, based on the pre-configuration or other method, may be valid in one or multiple time locations. For example, the resources may be valid in time locations N+3 and N+5. If the resources are valid in multiple time locations, the wireless device selects which resources to use, based on its capability to process control plane messages quickly and/or its current operating state (e.g. its current processing capacity). For example, if the wireless device is capable of processing control plane messages relatively quickly, it may select the resources in time location N+3; if the wireless device is capable of processing control plane messages relatively slowly, it may select the resources in time location N+5. The wireless device then transmits a message (e.g. a request to establish or resume a connection) utilizing the selected resources.

The network node receives the message and responds with a message including a command to establish or resume a connection, e.g. an RRC connection. The network node also determines, based on the resources (i.e. the time location) on which the message was transmitted by the wireless device, the rate at which the wireless device is capable of processing control plane messages and/or the current operating state of the wireless device. If the wireless device is capable of processing control plane messages relatively quickly, and/or has a relatively low processing load, the network node may transmit to the wireless device a grant of resources which are relatively early in which to transmit one or more further uplink messages (e.g. a connection establishment complete or similar). Thus the wireless device's ability to process control plane messages quickly can be utilized to reduce the latency of the signaling. If the wireless device is capable of processing control plane messages relatively slowly and/or has a relatively high processing load, the network node may transmit to the wireless device a grant of resources which are relatively late (i.e. resources in a time location which is later than the relatively early grant of resources) in which to transmit the one or more further uplink messages.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A network node for provisioning uplink transmission, the network node comprising:
 node processing circuitry configured to:
  transmit at least one random access (RA) message, the at least one RA message including an uplink grant, the uplink grant comprising an indication of radio resources, the indicated radio resources being valid in a plurality of time locations, for uplink transmission to respond to the at least one RA message; and receive a response message, the response message being received according to one of the plurality of time locations for uplink transmission.

2. The network node of claim 1, wherein the at least one RA message is a single RA message, the plurality of time locations including:
   a first time location for a first type of wireless device; and
   a second time location for a second type of wireless device.

3. The network node of claim 2, wherein the first time location for a first type of wireless device is different from the second time location for a second type of wireless device, the second time location reducing signaling latency when compared to signaling latency of the first time location.

4. The network node of claim 1, wherein the node processing circuitry is further configured to:
   responsive to a determination that the response message is received in a first time location of the plurality of time locations, infer that a wireless device which transmitted the response message is capable of processing control plane messages at a first rate; and
   responsive to a determination that the response message is received according to a second time location of the plurality of time locations, infer that the wireless device which transmitted the response message is capable of processing control plane messages at a second rate, which is slower than the first rate.

5. The network node of claim 1, wherein the node processing circuitry is further configured to:
   transmit a further message to the wireless device, the further message comprising a grant of resources for the wireless device to transmit an uplink message, the resources comprising one of:
      resources in a third time location, responsive to a determination that the response message is received in a first time location of the plurality of time locations; and
      resources in a fourth time location, responsive to a determination that the response message is received in a second time location of the plurality of time locations.

6. The network node of claim 5, wherein the first time location is a first time after transmission of the RA message, and the third time location is the first time after transmission of the further message; and
   wherein the second time location is a second time after transmission of the RA message, and the fourth time location is the second time after transmission of the further message.

7. The network node of claim 1, wherein the plurality of time locations includes a first time location and a second time location different from the first time location;
   the first time location indicating a subframe $n+k_1$ for the uplink transmission, where $k_1$ is one of greater than and equal to 6; and
   the second time location indicating a subframe $n+k_2$ for the uplink transmission, where $k_2$ is less than 6.

8. The network node of claim 1, wherein the node processing circuitry is further configured to receive an RA preamble message, the RA message being transmitted in response to the received RA preamble message.

9. The network node of claim 1, wherein the node processing circuitry is further configured to transmit an indication of a timing procedure to be followed by wireless devices for responding to the at least one RA message.

10. A method for a network node for provisioning uplink transmission, the method comprising:
    transmitting at least one random access (RA) message, the at least one RA message including an uplink grant, the uplink grant comprising an indication of radio resources, the indicated radio resources being valid in a plurality of time locations, for uplink transmission to respond to the at least one RA message; and
    receiving a response message, the response message being received according to one of the plurality of time locations for uplink transmission.

11. The method of claim 10, wherein the at least one RA message is a single RA message, the plurality of time locations including:
    a first time location for a first type of wireless device; and
    a second time location for a second type of wireless device.

12. The method of claim 11, wherein the first time location for a first type of wireless device is different from the second time location for a second type of wireless device, the second time location reducing signaling latency when compared to signaling latency of the first time location.

13. The method of claim 10, further comprising:
    responsive to a determination that the response message is received in a first time location of the plurality of time locations, inferring that a wireless device which transmitted the response message is capable of processing control plane messages at a first rate; and
    responsive to a determination that the response message is received according to a second time location of the plurality of time locations, inferring that the wireless device which transmitted the response message is capable of processing control plane messages at a second rate, which is slower than the first rate.

14. The method of claim 10, further comprising:
    transmitting a further message to the wireless device, the further message comprising a grant of resources for the wireless device to transmit an uplink message, the resources comprising one of:
       resources in a third time location, responsive to a determination that the response message is received in a first time location of the plurality of time locations; and
       resources in a fourth time location, responsive to a determination that the response message is received in a second time location of the plurality of time locations.

15. The method of claim 14, wherein the first time location is a first time after transmission of the RA message, and the third time location is the first time after transmission of the further message; and
    wherein the second time location is a second time after transmission of the RA message, and the fourth time location is the second time after transmission of the further message.

16. The method of claim 10, wherein the plurality of time locations includes a first time location and a second time location different from the first time location;
    the first time location indicating a subframe $n+k_1$ for the uplink transmission, where $k_1$ is one of greater than and equal to 6; and
    the second time location indicating a subframe $n+k_2$ for the uplink transmission, where $k_2$ is less than 6.

17. The method of claim 10, further comprising receiving an RA preamble message, the RA message being transmitted in response to the received RA preamble message.

18. The method of claim 10, further comprising transmitting an indication of a timing procedure to be followed by wireless devices for responding to the at least one RA message.

19. A wireless device, comprising:
device processing circuitry configured to:
receive at least one random access (RA) message, the at least one RA message including an uplink grant, the uplink grant comprising an indication of radio resources, the indicated radio resources being valid in a plurality of time locations, for uplink transmission to respond to the received at least one RA message; and
transmit a response message according to one of the plurality of time locations for uplink transmission.

20. The wireless device of claim 19, wherein the at least one RA message is a single RA message, the plurality of time locations including:
a first time location for a first type of wireless device;
a second time location for a second type of wireless device; and
the transmitted response message being transmitted according to one of the first time location for the first type of wireless device and the second time location for the second type of wireless device.

21. The wireless device of claim 20, wherein the first type of wireless device is a legacy wireless device; and
the second type of wireless device is a non-legacy wireless device.

22. The wireless device of claim 20, wherein the first time location for a first type of wireless device is different from the second time location for a second type of wireless device, the second time location reducing signaling latency when compared to signaling latency of the first time location.

23. The wireless device of claim 19, wherein the device processing circuitry is further configured to:
receive a further message, the further message comprising a grant of resources for the wireless device to transmit an uplink message, the resources comprising:
resources in a third time location, responsive to a determination that the response message was transmitted in a first time location of the plurality of time locations; and
resources in a fourth time location, responsive to a determination that the response message was transmitted in a second time location of the plurality of time locations.

24. The wireless device of claim 23, wherein the first time location is a first time after transmission of the RA message, and the third time location is the first time after transmission of the further message; and
wherein the second time location is a second time after transmission of the RA message, and the fourth time location is the second time after transmission of the further message.

25. The wireless device of claim 19, wherein the plurality of time locations includes a first time location and a second time location different from the first time location;
the first time location indicating a subframe $n+k_1$ for the uplink transmission, where $k_1$ is one of greater than and equal to 6; and
the second time location indicating a subframe $n+k_2$ for the uplink transmission, where $k_2$ is less than 6.

26. The wireless device of claim 19, wherein the device processing circuitry is further configured to transmit an RA preamble message, the RA message being received in response to the transmitted RA preamble message.

27. The wireless device of claim 19, wherein the device processing circuitry is further configured to receive an indication of a timing procedure to be followed by the wireless device for responding to the at least one RA message.

28. A method for a wireless device, the method comprising:
receiving at least one random access (RA) message, the at least one RA message including an uplink grant, the uplink grant comprising an indication of radio resources, the indicated radio resources being valid in a plurality of time locations, for uplink transmission to respond to the received at least one RA message; and
transmitting a response message according to one of the plurality of time locations for uplink transmission.

29. The method of claim 28, wherein the at least one RA message is a single RA message, the plurality of time locations including:
a first time location for a first type of wireless device;
a second time location for a second type of wireless device; and
the transmitted response message being transmitted according to one of the first time location for the first type of wireless device and the second time location for the second type of wireless device.

30. The method of claim 29, wherein the first type of wireless device is a legacy wireless device; and
the second type of wireless device is a non-legacy wireless device.

31. The method of claim 29, wherein the first time location for a first type of wireless device is different from the second time location for a second type of wireless device, the second time location reducing signaling latency when compared to signaling latency of the first time location.

32. The method of claim 28, further comprising:
receiving a further message, the further message comprising a grant of resources for the wireless device to transmit an uplink message, the resources comprising:
resources in a third time location, responsive to a determination that the response message was transmitted in a first time location of the plurality of time locations; and
resources in a fourth time location, responsive to a determination that the response message was transmitted in a second time location of the plurality of time locations.

33. The method of claim 32, wherein the first time location is a first time after transmission of the RA message, and the third time location is the first time after transmission of the further message; and
wherein the second time location is a second time after transmission of the RA message, and the fourth time location is the second time after transmission of the further message.

34. The method of claim 28, wherein the plurality of time locations includes a first time location and a second time location different from the first time location;
the first time location indicating a subframe $n+k_1$ for the uplink transmission, where $k_1$ is one of greater than and equal to 6; and
the second time location indicating a subframe $n+k_2$ for the uplink transmission, where $k_2$ is less than 6.

35. The method of claim 28, further comprising transmitting an RA preamble message, the RA message being received in response to the transmitted RA preamble message.

36. The method of claim 28, further comprising receiving an indication of a timing procedure to be followed by the wireless device for responding to the at least one RA message.

* * * * *